(12) United States Patent
Sun et al.

(10) Patent No.: US 7,969,830 B2
(45) Date of Patent: Jun. 28, 2011

(54) NEAR FIELD OPTICAL DISC AND NEAR FIELD OPTICAL DISC READING APPARATUS

(75) Inventors: Ching-Cherng Sun, Taoyuan County (TW); Yeh-Wei Yu, Hsinchu County (TW); Yi-Chien Lo, Miaoli County (TW); Din-Ping Tsai, Taipei (TW); Chih-Yuan Cheng, Tainan County (TW)

(73) Assignee: National Central University, Taoyuan (TW)

( * ) Notice: Subject to any disclaimer, the term of this patent is extended or adjusted under 35 U.S.C. 154(b) by 52 days.

(21) Appl. No.: 12/637,770

(22) Filed: Dec. 15, 2009

(65) Prior Publication Data

US 2010/0284254 A1  Nov. 11, 2010

(30) Foreign Application Priority Data

May 11, 2009 (TW) .............................. 98115531 A

(51) Int. Cl.
*G11B 7/00* (2006.01)
(52) U.S. Cl. ............. 369/44.25; 369/44.12; 369/112.27; 369/112.28; 369/118

(58) Field of Classification Search ........................ None
See application file for complete search history.

(56) References Cited

U.S. PATENT DOCUMENTS

| 6,687,200 | B1 * | 2/2004 | Kobayashi | 369/44.26 |
| 7,154,820 | B2 * | 12/2006 | Nakada et al. | 369/13.32 |
| 2006/0127003 | A1 * | 6/2006 | Park et al. | 385/31 |

* cited by examiner

*Primary Examiner* — Muhammad N Edun
(74) *Attorney, Agent, or Firm* — Jianq Chyun IP Office

(57) ABSTRACT

A near field optical disc and a near field optical disc reading apparatus are provided. The near field optical disc has at least one light source and a near field optical pick-up head, and the near field optical disc includes a light guiding substance, a first reflection layer and a second reflection layer. The light guiding substance has a first surface, a second surface opposite thereto and at least one light entrance window. Light emitted from the light source enters the light guiding substance through the light entrance window. The second reflection layer is disposed on the second surface. The first reflection layer is disposed on the first surface and has a plurality of light pervious holes. A part of the light is transmitted through the light pervious holes and picked up by the near field optical pick-up head.

17 Claims, 3 Drawing Sheets

NEAR FIELD OPTICAL DISC AND NEAR FIELD OPTICAL DISC READING APPARATUS

CROSS-REFERENCE TO RELATED APPLICATION

This application claims the priority benefit of Taiwan application serial no. 98115531, filed May 11, 2009. The entirety of the above-mentioned patent application is hereby incorporated by reference herein and made a part of specification.

BACKGROUND OF THE INVENTION

1. Field of the Invention

The present invention relates to an optical disc and an optical disc drive. More particularly, the present invention relates to a near field optical disc and a near field optical disc reading apparatus.

2. Description of Related Art

With development of storage technology, an optical disc using such technique may have advantages of large storage capacity, easy preservation, long duration of preservation, low cost and non-easiness of damage of data, etc., and data stored in the optical disc can be easily read through an optical disc drive. Generally, a read and write method of the optical disc is to focus a laser light on the optical disc through an objective lens, so as to perform the read and write operation, and a storage capacity of the optical disc is determined based on an area size of the optical disc. In case that the area size of the optical disc is fixed, if the storage capacity thereof is required to be further increased, a recording density of the optical disc has to be improved, or a wavelength of the laser light has to be shortened. However, limited by a physical restriction of diffraction limit, increasing of the storage capacity of the optical disc is bottlenecked. To resolve such problem, a concept of a near field super-resolution structure is provided, by which a near field optical principle is used to greatly improve the storage capacity of the optical disc.

The near field optics is a novel optics theory. In 1928, a British E. H. Synge first proposed a concept of obtaining optical information within a near field range, i.e. within a distance that electromagnetic waves still not generate interference and diffraction, so as to obtain a high spatial resolution beyond the diffraction limit. Then, in 1956, an American O'keefe also proposed a similar concept of using a hole with a size far less than a wavelength of a light source to closely approach to a surface of an object to be detected, so as to detect the optical information. However, limited by an engineering art of that time, E. H. Synge and O'keefe could not proof such concept by experiment.

In 1972, E. A. Ash and G. Nicholes first verified such concept by experiment. In the experiment, a microwave with a wavelength of 3 cm is used to observe the object within a distance that a light fluctuation does not generate a diffraction phenomenon, so as to obtain a spatial resolution with about $\frac{1}{60}$ wavelength. This experiment is a first verification of the near field optics theory.

Then, in 1992, the American AT&T and Bell Labs obtain a super-high density surface record from a magneto-optical CoPt multiplayer film via the near field optics method. A method thereof is to melt and extend an optical fiber to form a probe with a nano-scale for performing light sending and receiving, which can write record points with a diameter of 60 nanometers on the magneto-optical CoPt multiplayer film, and can read signals of the record points. An experiment result shows that a super recording density of 45 gigabits can be achieved within each square inch.

A near field optical disc reading apparatus manufactured by the AT&T and Bell Labs according to a principle of the experiment has to integrate a light source into an optical pick-up head, so that light emitted from the light source and light reflected by the record points can all pass through the optical fiber probe, so as to achieve an effect of reading data according to the near field optical principle to overcome the diffraction limit. However, to make both the light emitted from the light source and the light reflected by the record points pass through the optical fiber probe with a tiny diameter, when the light source is installed and aligned to the optical pick-up head, it has to be installed to a very accurate position. Therefore, a permissible alignment error thereof is very small, which may lead to a long fabrication time and a high fabrication cost of the whole data reading apparatus.

SUMMARY OF THE INVENTION

Accordingly, the present invention is directed to a near field optical disc, according which a fabrication time and a fabrication cost of a data reading apparatus used for reading the near field disc can be reduced.

The present invention is directed to a near field optical disc reading apparatus, which has an advantage of short fabrication time and low fabrication cost.

The present invention provides a near field optical disc suitable for being read by a near field optical disc reading apparatus. The near field optical disc reading apparatus has at least one light source and a near field optical pick-up head, while the near field optical disc includes a light guiding substance, a first reflection layer and a second reflection layer. The light guiding substance has a first surface, a second surface opposite to the first surface, and at least one light entrance window. Light emitted from the light source is suitable for entering the light guiding substance through the light entrance window. The second reflection layer is disposed on the second surface. The first reflection layer is disposed on the first surface and has a plurality of light pervious holes. The light emitted from the light source is suitable for being reflected between the first reflection layer and the second reflection layer, and a part of the light is suitable for being transmitted through the light pervious holes and picked up by the near field optical pick-up head.

In an embodiment of the present invention, the light guiding substance further has a side surface connected to the first surface and the second surface, and the light entrance window is disposed at the side surface.

In an embodiment of the present invention, the side surface of the light guiding substance is inclined relative to the first surface and the second surface.

In an embodiment of the present invention, the side surface of the light guiding substance is a curved surface suitable for diverging the light emitted from the light source.

In an embodiment of the present invention, the side surface of the light guiding substance is a rough surface.

In an embodiment of the present invention, the light entrance window is disposed at the second reflection layer, so that the light emitted from the light source passes through the second reflection layer through via light entrance window. Moreover, the light entrance window is a ring-shape light entrance window.

In an embodiment of the present invention, a part of the second surface located at the light entrance window is a curved surface suitable for diverging the light emitted from the light source.

In an embodiment of the present invention, a part of the second surface located at the light entrance window is a rough surface.

In an embodiment of the present invention, an aperture of the light pervious hole is less than 600 nanometers.

The present invention provides a near field optical disc reading apparatus, which is suitable for reading data from the aforementioned near field optical disc. The near field optical disc reading apparatus has at least one light source and a near field optical pick-up head. The light source is disposed beside a light entrance window, and light emitted from the light source is suitable for entering inside of the near field optical disc through the light entrance window. The near field optical pick-up head is disposed beside the light pervious holes for reading the light transmitted through the light pervious holes.

In an embodiment of the present invention, the light source is disposed beside the light entrance window located at the side surface of the near field optical disc, and the near field optical pick-up head is disposed beside the light pervious holes located on the first surface or the second surface.

In an embodiment of the present invention, the light source is disposed beside the light entrance window located at the second surface, and the near field optical pick-up head is disposed beside the light pervious holes located at the first surface.

In an embodiment of the present invention, the light source is a light emitting diode (LED).

In an embodiment of the present invention, the near field optical pick-up includes at least one optical fiber probe for receiving light transmitted through the light pervious holes.

In an embodiment of the present invention, a quantity of the at least one optical fiber probe is multiple, and the optical fiber probes are arranged in a one-dimensional array.

In an embodiment of the present invention, the near field optical disc reading apparatus further includes a light-shielding plate. The near field optical pick-up head and the light-shielding plate are located at the same side of the near field optical disc. The light-shielding plate has an opening exposing the light pervious holes, and the light-shielding plate is suitable for shielding light that is emitted from the light source and does not enter inside of the near field optical disc, so as to avoid the light which does not enter the inside of the near field optical disc being transmitted to the near field optical pick-up head.

The near field optical disc of the present invention applies a design of the light entrance window and the light pervious holes, so that a position where the light emitted from the light source is incident upon the near field optical disc is different to a position where the light exits from the near field optical disc. Therefore, the light source of the near field optical disc reading apparatus can be independent to the near field optical pick-up head, so that an error permissible degree of an installed position of the light source is relatively great, and therefore a fabrication time and a fabrication cost of the near field optical disc reading apparatus are reduced.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

Figure 1A:
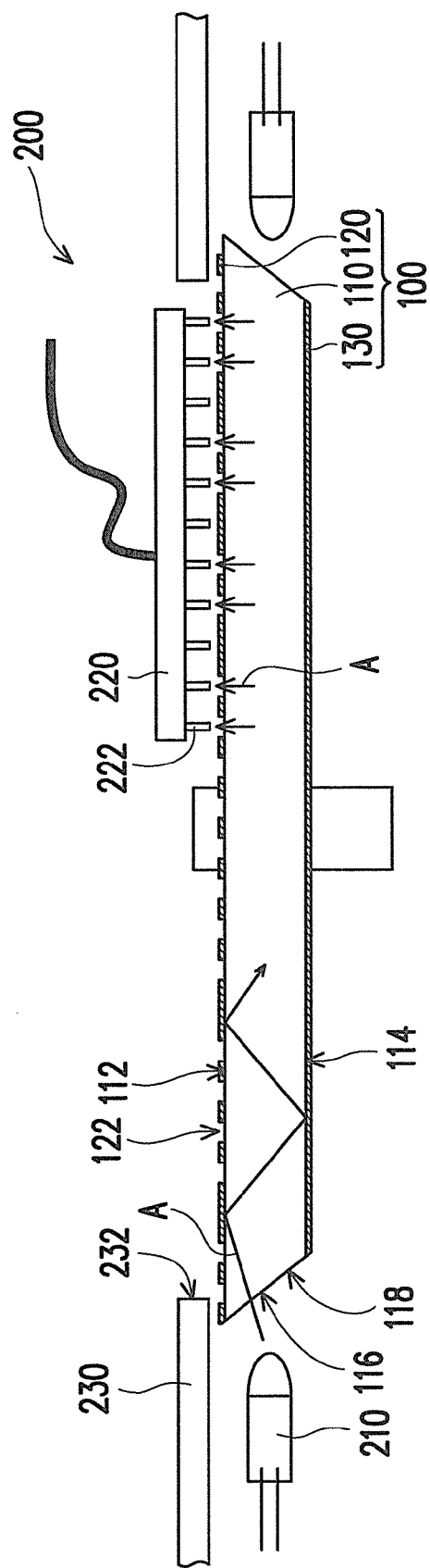
FIG. 1A is a side view of a near field optical disc and a near field optical disc reading apparatus according to an embodiment of the present invention.
Figure 1B:
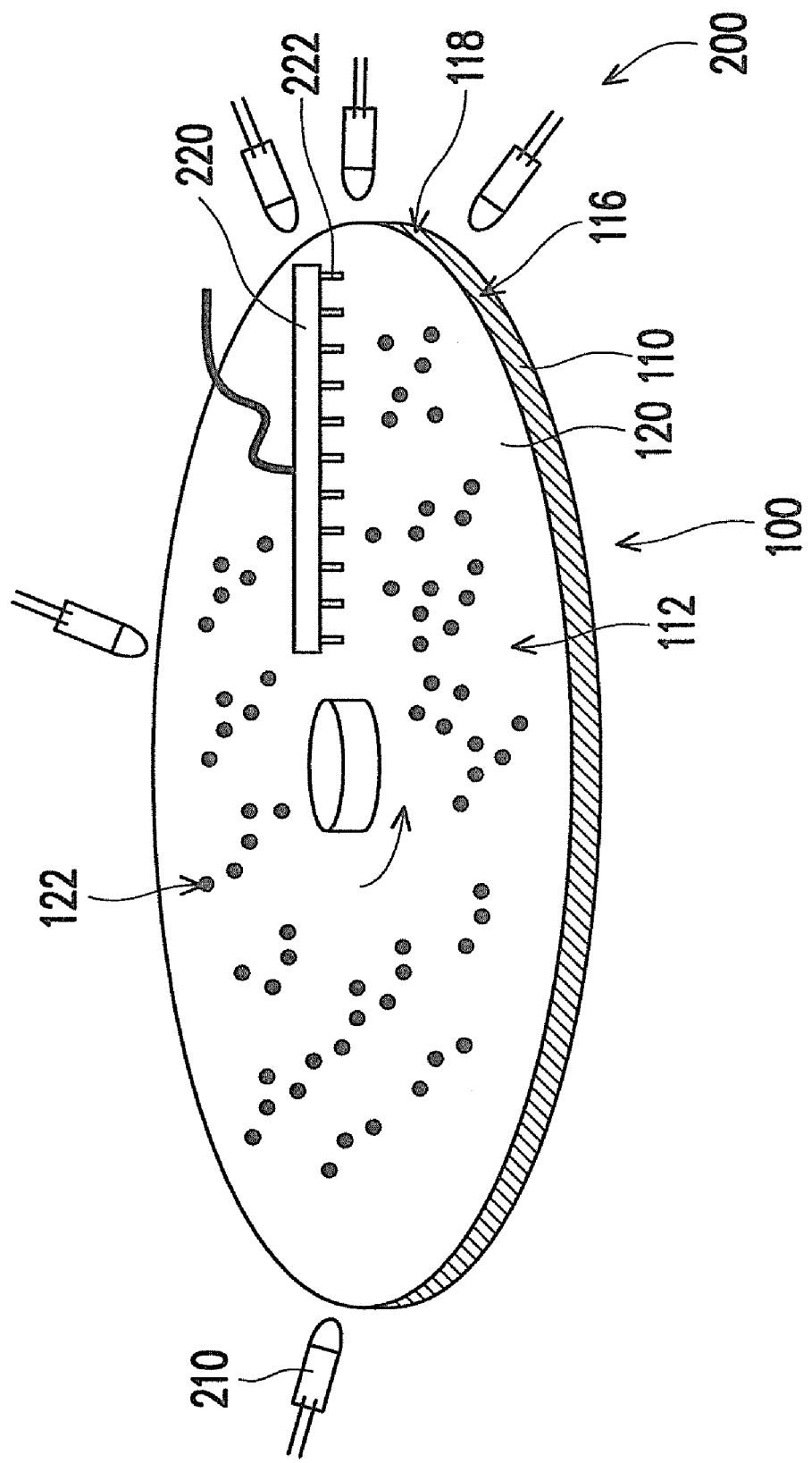
FIG. 1B is a three-dimensional view of a near field optical disc and a near field optical disc reading apparatus of FIG. 1A.

FIG. 1A is a side view of a near field optical disc and a near field optical disc reading apparatus according to an embodiment of the present invention. FIG. 1B is a three-dimensional view of the near field optical disc and the near field optical disc reading apparatus of FIG. 1A, and for simplicity's sake, a light-shielding plate is not illustrated therein. Referring to FIG. 1A and FIG. 1B, the near field optical disc reading apparatus 200 is suitable for reading data from the near field optical disc 100. The near field optical disc reading apparatus 200 includes at least one light source 210 and a near field optical pick-up head 220, and the near field optical disc 100 includes a light guiding substance 110, a first reflection layer 120 and a second reflection layer 130. The light guiding substance 110 has a first surface 112, a second surface 114 opposite to the first surface 112, a side surface 116 connected to the first surface 112 and the second surface 114, and a light entrance window 118, wherein the light entrance window 118 is located at the side surface 116 of the light guiding substance 110. The light source 210 is disposed beside the light entrance window 118, and light A emitted from the light source 210 is suitable for entering the light guiding substance 110 through the light entrance window 118. The second reflection layer 130 is disposed on the second surface 114. The first reflection layer 120 is disposed on the first surface 112 and has a plurality of light pervious holes 122. The near field optical pick-up head 220 is disposed beside the light pervious holes 122. The light A emitted from the light source 210 is suitable for being reflected between the first reflection layer 120 and the second reflection layer 130. Namely, the light guiding substance 110 is filled with the light A repeatedly reflected between the first reflection layer 120 and the second reflection layer 130. Moreover, a part of the light A emitted from the light source 210 is suitable for being transmitted through the light pervious holes 122 and picked up by the near field optical pick-up head 220.

The near field optical disc 100 of the present embodiment applies a design of the light entrance window 118 and the light pervious holes 122, so that a position where the light A is incident upon the near field optical disc 100 can be different to a position where the light A exits from the near field optical disc 100. Therefore, the light source 210 of the near field optical disc reading apparatus 200 can be independent to the near field optical pick-up head 220, so that an error permissible degree of an installed position of the light source 210 is relatively great, and therefore a fabrication time and a fabrication cost of the near field optical disc reading apparatus 200 are reduced.

In the present embodiment, the near field optical pick-up head 220 includes a plurality of optical fiber probes 222, wherein the optical fiber probes 222 are, for example, arranged in a one-dimensional array for respectively receiving the light A transmitted through the light pervious holes 122 located on different tracks of the near field optical disc 100. Moreover, an aperture of the light pervious hole 122 can be 600 nanometers or less. When the aperture of the light pervious hole 122 is small enough, the light A emitted from the light source 210 cannot totally penetrate through the light pervious holes 122, and is confined around the first surface 112 of the light guiding substance 110. Now, if the near field optical disc 100 is observed by human eyes, it is discovered that the light A is not transmitted through the light pervious holes 122. However, when the optical fiber probes 222 are very closed to the light pervious holes 122, the light A confined around the first surface 112 can smoothly enter the optical fiber probes 222, and can be picked up by the near field optical reading head 220. By judging whether the optical fiber probes 222 approach the light pervious holes 122 to receive the light A transmitted through the light pervious holes 122 or not, and transmit the light A to an inside optical detector (not shown) of the near field optical pick-up head 220, the near field optical pick-up head 220 can output a corresponding digital signal.

It should be noticed that a quantity and an arrangement method of the optical fiber probes 222 are not limited by the present invention. In other embodiments, the near field optical pick-up head 220 may have only one optical fiber probe 222, or may have a plurality of the optical fiber probes 222 arranged in an arbitrary approach. Moreover, a diameter of the optical fiber probe 222 can be designed according to the aperture of the light pervious hole 122, so that the diameter of the optical fiber probe 222 can meet a demand of transmitting the light A transmitted through the light pervious hole 122.

According to the structure of the present embodiment, a mechanism of the present invention can be implemented as long as a part of the light A emitted from the light source 210 enters the light entrance window 118, which is different to most of the conventional optical disc drives that the light emitted from the light source must have a better collimation for being aligned to the tracks of the optical disc. Therefore, in the present embodiment, the light source 210 can be a low cost light source with a simple structure, for example, a light-emitting diode (LED). In addition, no other focus unit is required for being used together with the light source 210 to increase the collimation of the light A. Therefore, the cost of the near field optical disc reading apparatus 200 can be reduced.

In the present embodiment, the side surface 116 of the light guiding substance 110 can be inclined relative to the first surface 112 and the second surface 114, so that the light A entered the light guiding substance 110 through the light entrance window 118 can be repeatedly reflected between the first reflection layer 120 and the second reflection layer 130 more times, so as to increase a uniformity of the light A within the light guiding substance 110. Therefore, the light A transmitted through the light pervious holes 122 at different positions may have a consistent light intensity. In other embodiments, the side surface 116 of the light guiding substance 110 can also be designed into a rough surface suitable for scattering the light A emitted from the light source 210 and/or a curved surface suitable for diverging the light A emitted from the light source 210, or other surfaces with suitable patterns, so as to increase the uniformity of the light A within the light guiding substance 110.

In the present embodiment, the near field optical disc reading apparatus 200 can further include a light-shielding plate 230, wherein the near field optical pick-up head 220 and the light-shielding plate 230 are located at the same side of the near field optical disc 100. The light-shielding plate 230 has an opening 232 exposing the light pervious holes 122, and the light-shielding plate 230 is suitable for shielding light that is emitted from the light source 210 and does not enter the inside (i.e. the light guiding substance 110) of the near field optical disc 100, so as to avoid the light which does not enter the inside of the near field optical disc 100 being transmitted to the near field optical pick-up head 220. By such means, noise and a possibility of misjudgement of the near field optical pick-up head 220 can be reduced.

Figure 2:
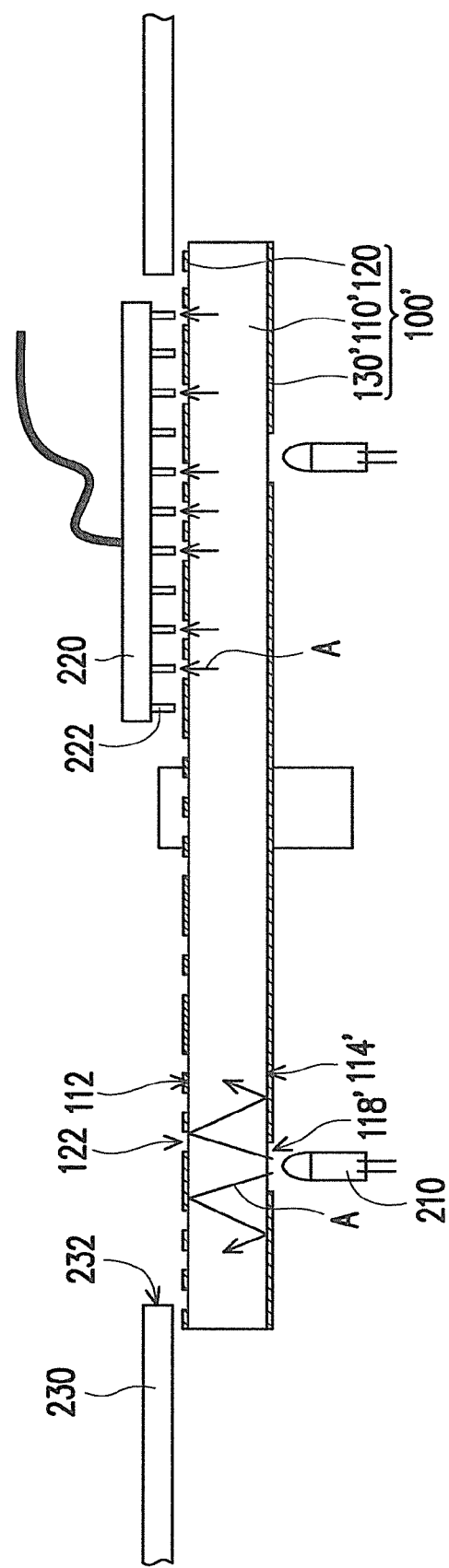
FIG. 2 is a side view of a near field optical disc and a near field optical disc reading apparatus according to another embodiment of the present invention.

Referring to FIG. 2, in another embodiment of the present invention, a light entrance window 118' can also be disposed at a second reflection layer 130', and the light source 210 can be disposed beside the light entrance window 118', so that the light A can pass through the second reflection layer 130' via the light entrance window 118' to enter a light guiding substance 110'. Moreover, during a rotation of a near field optical disc 100', to ensure that the light A emitted from the light source 210 can enter the light guiding substance 110' through the light entrance window 118' at any time, the light entrance window 118' can be designed into a ring-shape. Moreover, a part of a second surface 114' located at the light entrance window can be a rough surface and/or a curved surface suitable for diverging the light A emitted from the light source 210, or other surfaces with suitable shapes. It should be noticed that a quantity of the light entrance window 118' and a quantity of the light source 210 disposed beside the light entrance window 118' are not limited by the present invention, which can be one or multiple.

In summary, the near field optical disc of the present invention applies a design of the light entrance window and the light pervious holes, so that a position where the light emitted from the light source is incident upon the near field optical disc can be different to a position where the light exits from the near field optical disc. Therefore, the light source of the near field optical disc reading apparatus can be independent to the near field optical pick-up head, so that an error permissible degree of an installed position of the light source is relatively great, and therefore a fabrication time and a fabrication cost of the near field optical disc reading apparatus are reduced. Moreover, the mechanism of the present invention can be implemented as long as a part of the light emitted from the light source enters the light entrance window, which is different to most of the conventional optical disc drives that the light emitted from the light source must have a better collimation for being aligned to the tracks of the optical disc. Therefore, the light source used by the near field optical disc reading apparatus can be a low cost light source with a simple structure, and no other focus unit is required for being used together with the light source to increase the collimation of the light. Therefore, the cost of the near field optical disc reading apparatus can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A near field optical disc, suitable for being read by a near field optical disc reading apparatus, wherein the near field optical disc reading apparatus has at least one light source and a near field optical pick-up head, the near field optical disc comprising:

a light guiding substance, having a first surface, a second surface opposite to the first surface, and at least one light entrance window, light emitted from the light source being suitable for entering the light guiding substance through the light entrance window;

a second reflection layer, disposed on the second surface; and a first reflection layer, disposed on the first surface and having a plurality of light pervious holes, the light emitted from the light source being reflected between the first reflection layer and the second reflection layer, and a part of the light being transmitted through the light pervious holes and picked up by the near field optical pick-up head.

2. The near field optical disc as claimed in claim 1, wherein the light guiding substance further has a side surface connected to the first surface and the second surface, and the light entrance window is disposed at the side surface.

3. The near field optical disc as claimed in claim 2, wherein the side surface is inclined relative to the first surface and the second surface.

4. The near field optical disc as claimed in claim 2, wherein the side surface is a curved surface suitable for diverging the light emitted from the light source.

5. The near field optical disc as claimed in claim 2, wherein the side surface is a rough surface.

6. The near field optical disc as claimed in claim 1, wherein the light entrance window is disposed at the second reflection layer, so that the light emitted from the light source passes through the second reflection layer via the light entrance window.

7. The near field optical disc as claimed in claim 6, wherein the light entrance window is a ring-shape light entrance window.

8. The near field optical disc as claimed in claim 6, wherein a part of the second surface located at the light entrance window is a curved surface suitable for diverging the light emitted from the light source.

9. The near field optical disc as claimed in claim 6, wherein a part of the second surface located at the light entrance window is a rough surface.

10. The near field optical disc as claimed in claim 1, wherein an aperture of the light pervious hole is less than 600 nanometers.

11. A near field optical disc reading apparatus, suitable for reading data from a near field optical disc, the near field optical disc having a plurality of light pervious holes and at least one light entrance window, and the near field optical disc reading apparatus comprising:

at least one light source, disposed beside the light entrance window, and light emitted from the light source being suitable for entering inside of the near field optical disc through the light entrance window; and a near field optical pick-up head, disposed beside the light pervious holes for reading the light transmitted through the light pervious holes.

12. The near field optical disc reading apparatus as claimed in claim 11, wherein the near field optical disc has a first surface, a second surface opposite to the first surface, and a side surface connected to the first surface and the second surface, the light source is disposed beside the light entrance window located at the side surface, and the near field optical pick-up head is disposed beside the light pervious holes located on the first surface or the second surface.

13. The near field optical disc reading apparatus as claimed in claim 11, wherein the near field optical disc has a first surface and a second surface opposite to the first surface, the light source is disposed beside the light entrance window located on the second surface, and the near field optical pick-up head is disposed beside the light pervious holes located on the first surface.

14. The near field optical disc reading apparatus as claimed in claim 11, wherein the light source is a light emitting diode.

15. The near field optical disc reading apparatus as claimed in claim 11, wherein the near field optical pick-up comprises at least one optical fiber probe for receiving light transmitted through the light pervious holes.

16. The near field optical disc reading apparatus as claimed in claim 15, wherein the at least one optical fiber probe is a plurality of optical fiber probes, and the optical fiber probes are arranged in a one-dimensional array.

17. The near field optical disc reading apparatus as claimed in claim 11, further comprising a light-shielding plate, wherein the near field optical pick-up head and the light-shielding plate are located at the same side of the near field optical disc, the light-shielding plate has an opening exposing the light pervious holes, and the light-shielding plate is suitable for shielding light that is emitted from the light source and does not enter inside of the near field optical disc, so as to avoid the light which does not enter the inside of the near field optical disc being transmitted to the near field optical pick-up head.

* * * * *